(No Model.)
J. MACPHAIL.
HEADBOARD FOR HARVESTERS.
No. 574,812.  Patented Jan. 5, 1897.
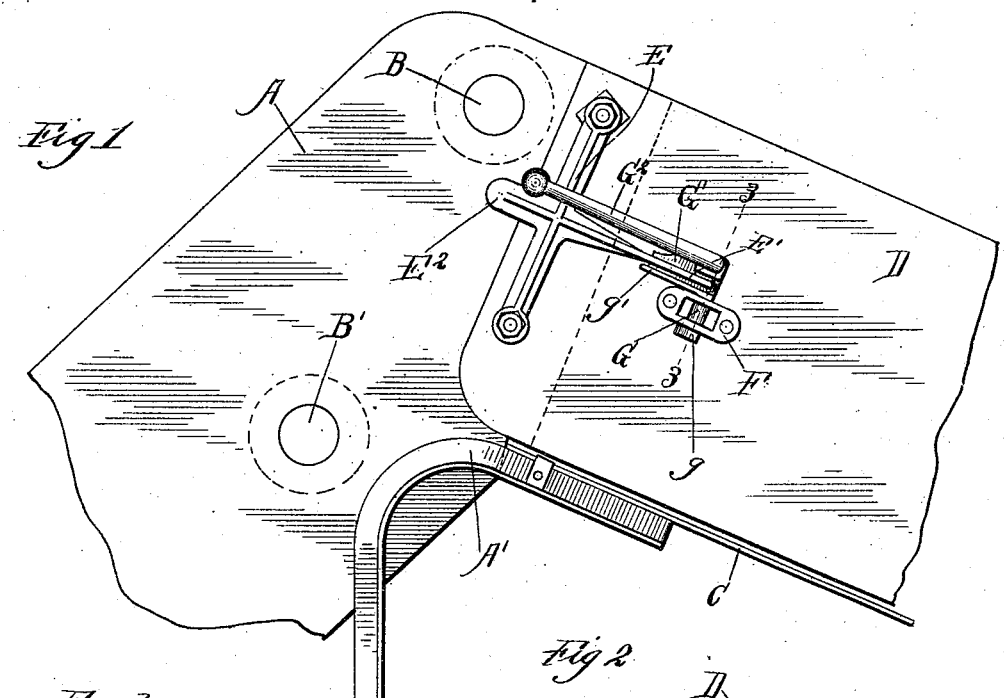
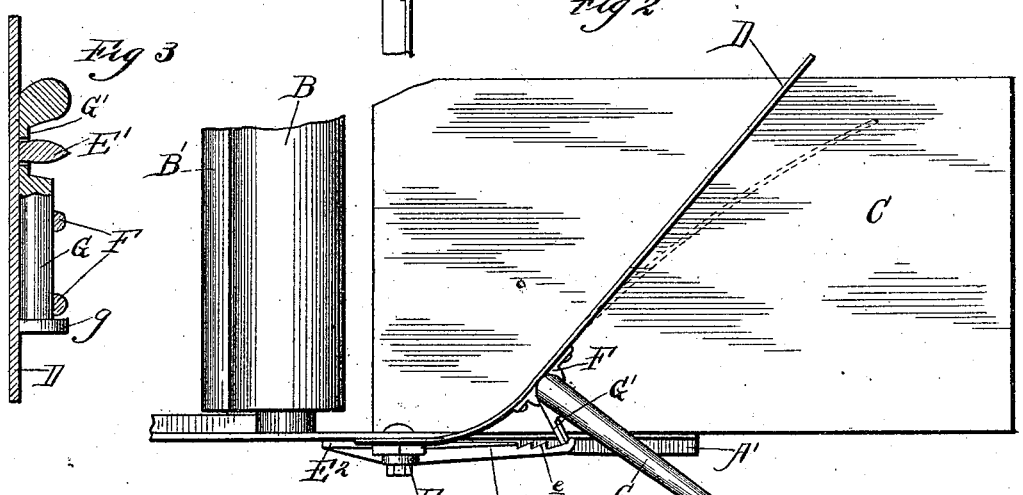
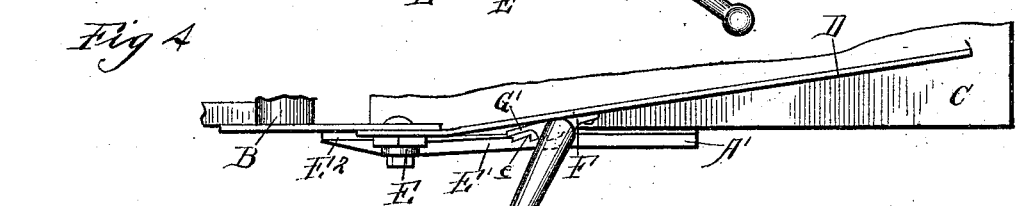
Witnesses
W. C. Coolie
C. H. Crawford
Inventor
James Macphail
By Coburn & Strong
Attys
THE NORRIS PETERS CO., PHOTO-LITHO., WASHINGTON, D. C.

UNITED STATES PATENT OFFICE.

JAMES MACPHAIL, OF CHICAGO, ILLINOIS, ASSIGNOR TO THE PLANO MANUFACTURING COMPANY, OF SAME PLACE.

HEAD-BOARD FOR HARVESTERS.

SPECIFICATION forming part of Letters Patent No. 574,812, dated January 5, 1897.

Application filed September 21, 1896. Serial No. 606,509. (No model.)

*To all whom it may concern:*

Be it known that I, JAMES MACPHAIL, a citizen of the United States, residing at Chicago, in the county of Cook and State of Illinois, have invented a certain new and useful Improvement in Head-Boards for Harvesters, which is fully set forth in the following specification, reference being had to the accompanying drawings, in which—

Figure 1 is a side elevation of the upper portion of the elevator-frame of a grain-binding harvester and the portion of the head-board which constitutes my invention attached thereto. Fig. 2 is a plan view of the structure shown in elevation in Fig. 1 with the head-board adjusted inward for short grain. Fig. 3 is a vertical section on the line 3 3 of Fig. 1. Fig. 4 is a plan view similar to Fig. 2 with the head-board in its normal position adapted for long grain.

My invention relates to head-boards for grain-binding harvesters, and particularly to that class which can be adjusted inward and outward to adapt the width of the binding-deck to either longer or shorter grain.

My invention has for its object to simplify the construction of such adjustable head-boards and at the same time to secure the maximum of adjustable capacity therein.

Referring to the drawings by letter, A represents the upper end of the elevator-frame or A-frame of a grain-binding harvester, of any preferred form, supported by the standard A' and provided with the elevator apron-rolls B and B' in the usual manner. These parts, as well as the binding-deck C, are of the usual construction.

To the elevator-frame and extending down along the binding-deck I secure the spring-metal head-board D. In the drawings I have shown the said head-board attached to the elevator-frame through the bracket E, which carries the rack-arm E', presently described. This is the more economical form of construction. The said head-board may, however, be secured to the elevator-frame in any other convenient way.

The bracket E, as above stated, carries a rack-arm E', which extends parallel to the head-board when the same is in its normal outward position. The said rack-arm is provided with teeth $e$ on its inner side adjacent to the head-board. The bracket E is preferably further provided with a short arm $E^2$, extending in a direction opposite to that of the rack-arm E' and bearing against the elevator-frame A.

Upon the head-board D is mounted a bracket F, in which are formed bearings for a short rock-shaft or pin G. The pin G is provided at its lower end with a lug $g$, which prevents the pin from coming out of its bearings. In its bearing in the bracket F the pin G carries a dog G', adapted to engage with the teeth $e$ on the rack-arm E'. The dog G' may be provided with a rib or flange $g'$ to insure the engagement of the said dog and said teeth. Finally, the upper end of the pin G carries a crank-arm $G^2$ so disposed that when the dog G' is out of engagement with the rack-arm and lies against the head-board the said crank-arm $G^2$ stands out from the said head-board, as shown in Fig. 4.

The operation of the construction hereinabove described is obvious from the drawings.

In its normal position the head-board stands as is shown in Fig. 4. When it is desired to adjust it inward to accommodate shorter grain, the crank-arm $G^2$ is swung around and the dog G' engages with one of the teeth $e$, holding the said head-board in its inward adjusted position. The spring of the metal holds the dog firmly in engagement with the tooth $e$. By this construction there is secured both the automatic adjustment of the spring head-board itself to the slight variation in the length of grain and the easily-operated adjustment of the whole head-board inward and outward by the very simple mechanism described. It is obvious that many modifications of this construction may be made without departing from the spirit of my invention. Thus the head-board may be pivotally attached to the elevator-frame with an accessory spring connection to such attachment. Again, in case this form of attachment is used the head-board may be made stiff instead of flexible, although by this means the advantages of the flexible head-board are lost.

Having thus described my invention, what I claim and desire to secure by Letters Patent, is—

1. In a harvester, the elevator-frame, A; the head-board, D, attached at one end to said elevator-frame by a spring connection adapted to retain the said head-board in an outward normal position; the rack-arm, E', secured to the elevator-frame; the dog, G', pivotally mounted on the head-board; and means adapted to rotate the dog into engagement with the rack-arm, E', and thereby thrust the said head-board inward.

2. In a harvester, the elevator-frame, A; the head-board, D, of spring metal, secured at one end to the elevator-frame; the rack-arm, E', secured to the elevator-frame; the dog, G', pivotally mounted on the head-board; and means adapted to rotate the dog into engagement with the rack-arm, E', and thereby thrust the said head-board inward.

3. In a harvester, the elevator-frame, A; the spring-metal head-board, D, secured at one end to the elevator-frame; the bracket, E, provided with the rack-arm, E', carrying the teeth, e, secured to said elevator-frame; the bracket, F, mounted on the head-board; the pin, G, adapted to rotate in the bracket, F, and provided with the crank-arm, $G^2$, and with the dog, G', adapted to engage with the teeth, e, constructed and operated, substantially as described.

JAMES MACPHAIL.

Witnesses:
FLORA BROM,
A. A. MURRAY.